United States Patent [19]

Cargill

[11] Patent Number: 4,721,432

[45] Date of Patent: Jan. 26, 1988

[54] APPARATUS FOR PRODUCING RECIPROCATING MOTION FOR PAINTING, SANDING OR COATING

[76] Inventor: Fithsroy P. Cargill, 942 Tilden St., Bronx, N.Y. 10469

[21] Appl. No.: 905,519

[22] Filed: Sep. 10, 1986

[51] Int. Cl.⁴ ........................ B24B 23/04; F16H 19/06

[52] U.S. Cl. .................................... 414/749; 15/97 R; 51/34 F; 51/170 TL; 74/37

[58] Field of Search ............................ 74/37; 15/97 R; 414/749–753; 474/133, 135, 167, 184; 51/59 R, 34 F, 170 TL, 175

[56] References Cited

U.S. PATENT DOCUMENTS

| | | | |
|---|---|---|---|
| 2,415,233 | 2/1947 | Brustowsky | 74/37 X |
| 2,911,835 | 11/1959 | Smith | 74/37 |
| 3,029,649 | 4/1962 | Steyh | 74/37 |
| 3,061,215 | 10/1962 | Chidgey, Jr. et al. | 74/37 X |
| 3,067,961 | 12/1962 | Chidgey, Jr. et al. | 74/37 X |
| 3,390,582 | 7/1968 | Bovone | 74/37 |
| 3,406,580 | 10/1968 | Zappia | 74/37 |
| 3,489,020 | 1/1970 | Angst | 74/37 |
| 4,270,089 | 5/1981 | Häberlein | 74/37 X |

FOREIGN PATENT DOCUMENTS

| | | | |
|---|---|---|---|
| 1256266 | 2/1961 | France | 74/37 |
| 58099 | 9/1969 | Poland | 74/37 |
| 1004696 | 3/1983 | U.S.S.R. | 74/37 |

*Primary Examiner*—Robert J. Spar
*Assistant Examiner*—P. McCoy Smith
*Attorney, Agent, or Firm*—Sam D. Walker

[57] ABSTRACT

The present invention is concerned with an article carrier adaptable for the transportation of a variety of functional apparatus such as painting, coating, sanding and buffing apparatuses and a transport mechanism comprising a pair of spaced apart pulleys, a continuous drive belt of resilient material entrained about said pulleys, a switch actuated motor for driving the pulley wheels and the belt, and at least one belt cam permanently attached to the belt for gripping a cam holder attached to a holding member which is mounted onto the holding plate, causing the belt cam to move the article carrier in both directions.

1 Claim, 9 Drawing Figures

APPARATUS FOR PRODUCING RECIPROCATING MOTION FOR PAINTING, SANDING OR COATING

FIELD OF THE INVENTION

The present invention is concerned with an article carrier and transport mechanism. More particularly, the present invention is concerned with an article carrier adaptable for the transportation of a variety of functional means and means for transporting same.

BACKGROUND OF INVENTION

Traditionally, painting and/or coating of surfaces have been accomplished by the use of a paint brush, a roller, sponge, wool, foam or other absorbent materials. Generally the surface is sanded or cleaned to remove foreign materials before it is painted or coated. Painting or coating was generally accomplished by manual means such as an upward or downward motion of the hand, pushing and pulling of a roller. In the case of sanding, a circular motion of the hand containing sand paper or by using a sanding machine is utilized. In the case of a sanding machine, a sand paper is attached to a vibrating or rotating means; powered by a motor or the like. This method, however, requires the utilization of the hand to guide it along. The problem with the above painting, coating and sanding means is the amount of manual work required to accomplish the desired end.

A object of the present invention is, therefore, to provide the painting and coating means requiring minimal manual work.

Another object of the present invention is to provide a sanding and buffing (sleeking) means requiring minimal manual work.

A further object of the present invention is to provide a transport mechanism for transporting the painting, coating, sanding and buffing means.

Still, another object of the present invention is to provide a switch actuated motor means as an energy source for the transport mechanism.

These and other objects will become more apparent as we proceed through the detailed description of the invention.

SUMMARY OF THE INVENTION

The present invention is concerned with an article carrier adaptable for the transportation of a variety of functional means and a transport mechanism comprising: a pair of spaced apart pulleys, a continuous drive belt of resilient material entrained about the pulleys, switch actuated motor means for driving the wheels and the belt in both direction, at least one belt cam permanently attached to the belt for gripping the article carrier against the belt by means of a first cam holder and spring mechanism which cause the belt cam to move the article carrier in one direction until it contacts a distant terminator for a desired distance, at which point the article carrier stops with the belt and pulleys still in motion causing the spring mechanism holding the cam holder against the belt to release its grip on the belt cam to allow the belt cam to continue about the pulley and is gripped by a second cam holder transporting the article carrier in an opposite direction.

DETAILED DESCRIPTION OF THE DRAWING

The following drawings will help to further illustrate the invention.

DETAILED DESCRIPTION OF THE INVENTION

Figure 1:
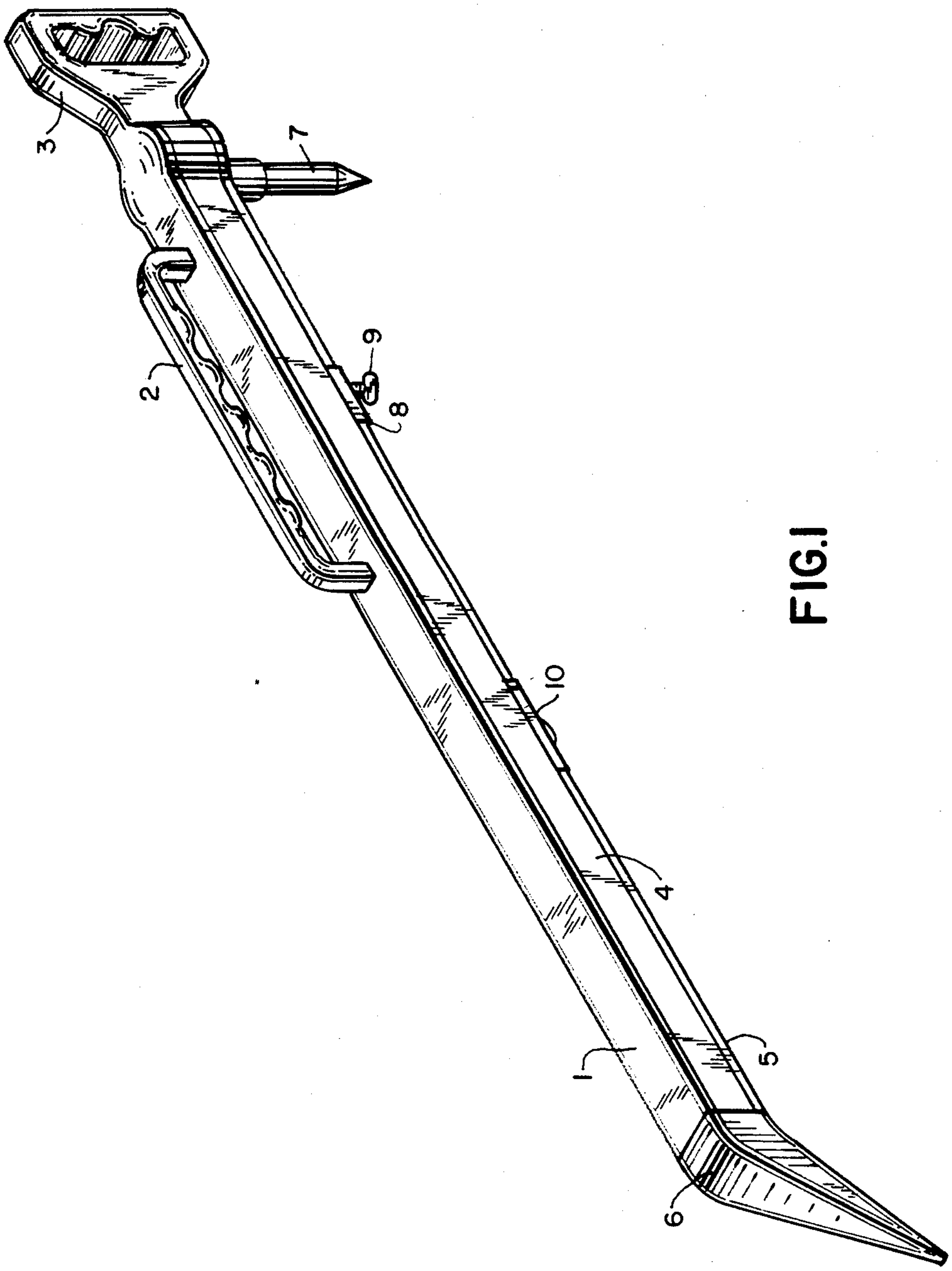
FIG. 1 illustrates the external features of the casing.

FIG. 1 of the present invention illustrates one arrangement of the preferred embodiment. In this arrangement the article carrier 10 is housed in a casing 1 which contains a front handle 2 and rear handle 3 which allows the operator to grip the casing firmly during operation. Further, to facilitate use of FIG. 1 also illustrates a front stabilizer 6 and a rear stabilizer 7 which allows for better control during operation.

Figure 2:
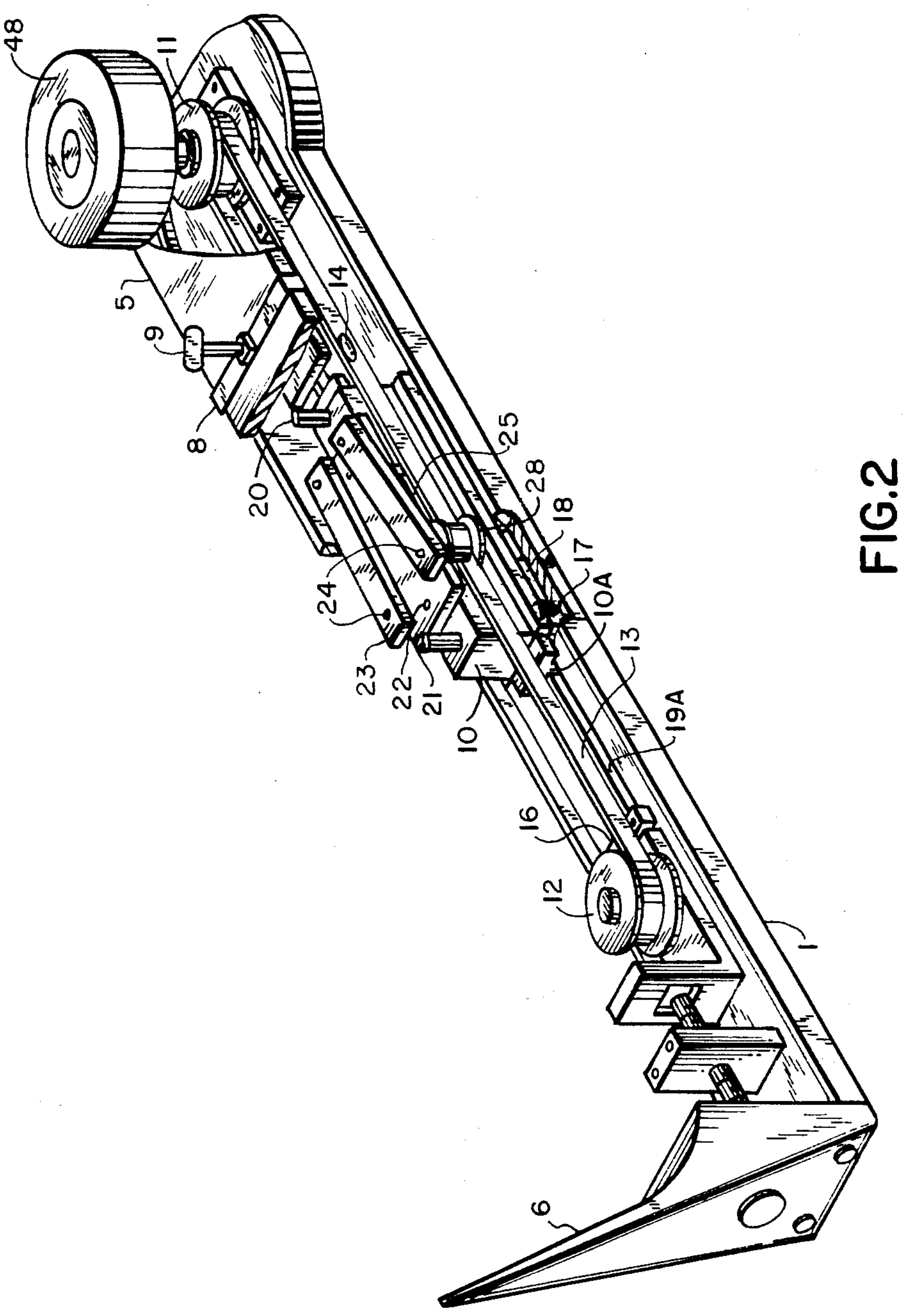
FIG. 2 is a perspective view of the invention without the casing showing all the functional parts.
Figure 3:
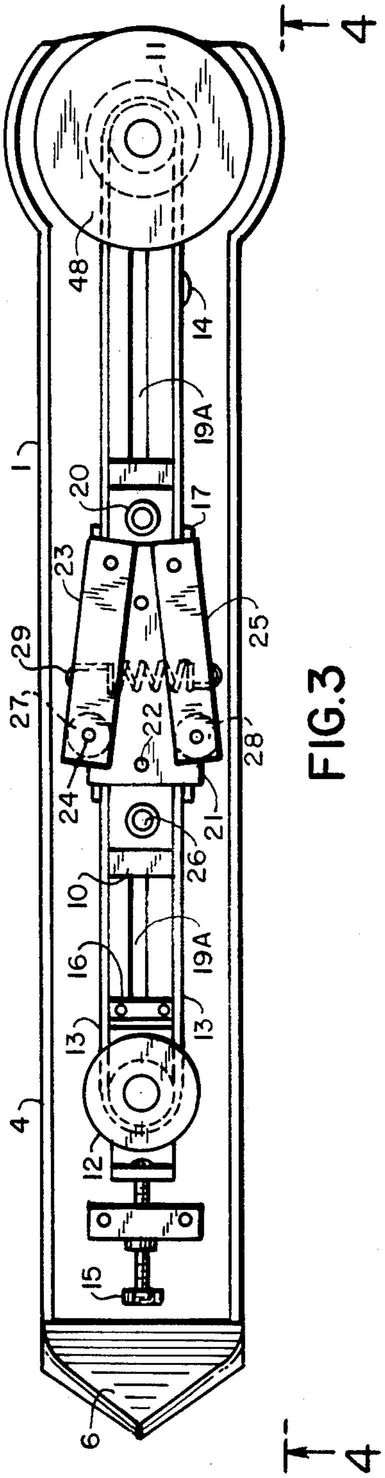
FIG. 3 is a top view of the invention showing the functional parts.
Figure 4:
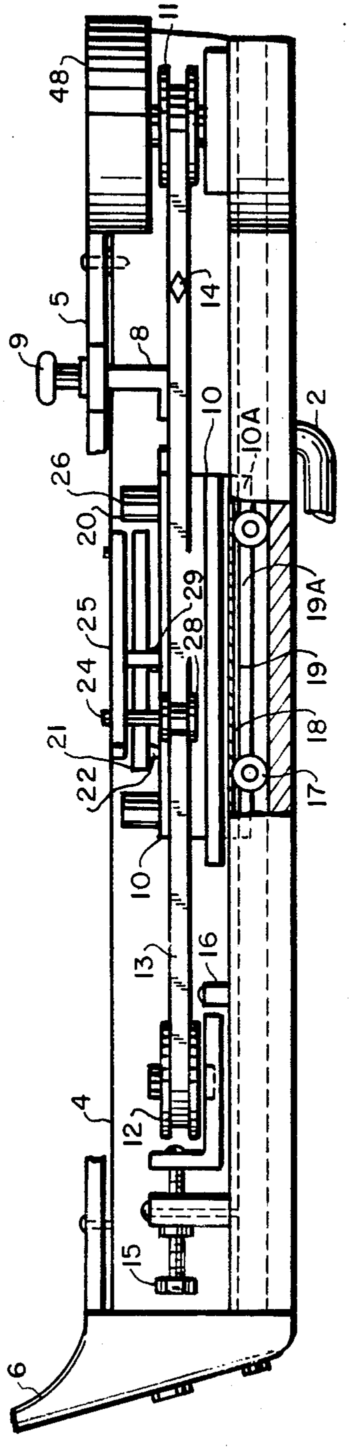
FIG. 4 is a side view of the invention showing the functional parts.
Figure 5:
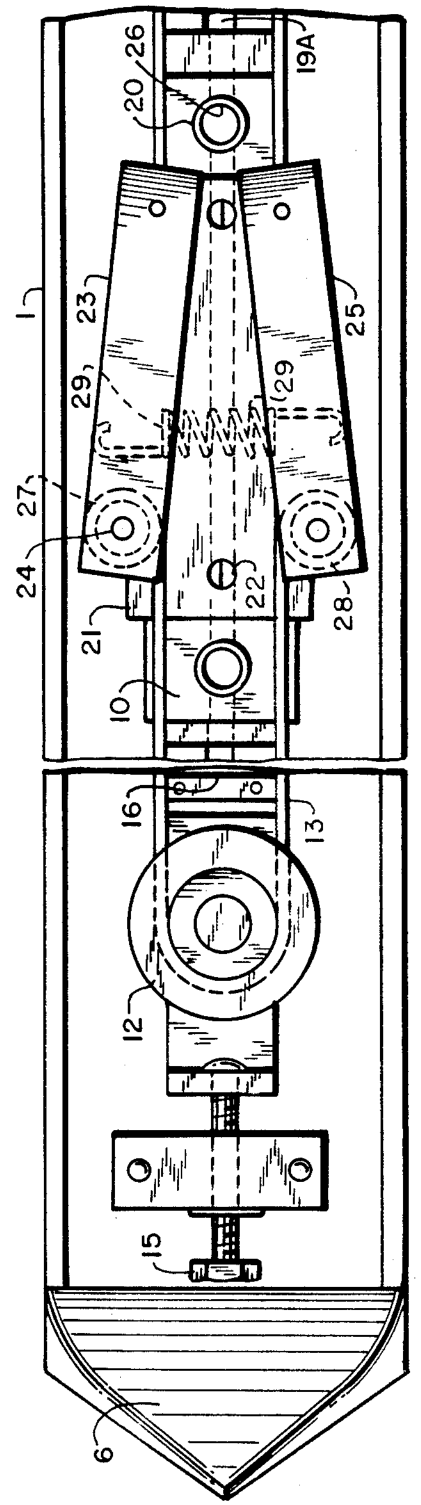
FIG. 5 is an enlarge view of FIG. 3 showing the article carrier terminated at the distant terminator and the cam holder spring extended to release the belt cam.
Figure 6:
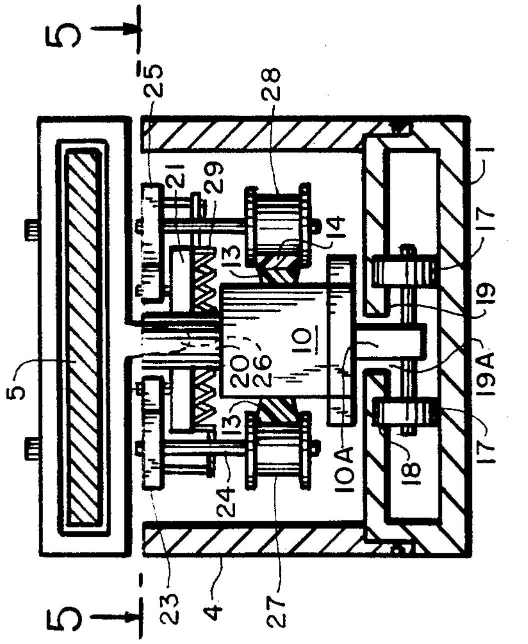
FIG. 6 shows the groove, upper lip and the article mount adapter.
Figure 7:
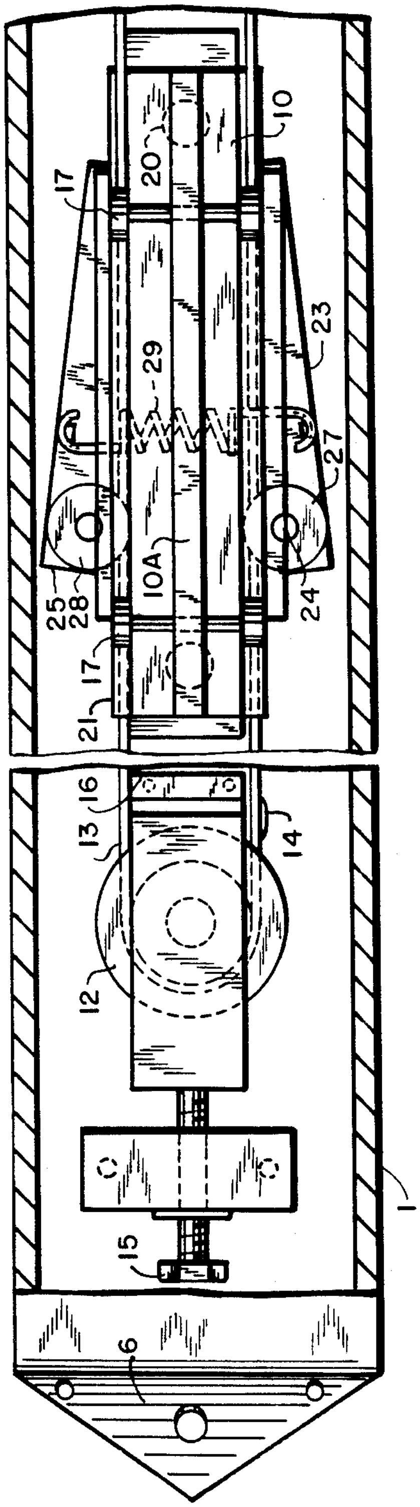
FIG. 7 is a sectional bottom view showing the belt cam after being released by the cam holder and approaching the pulley.
Figure 8:
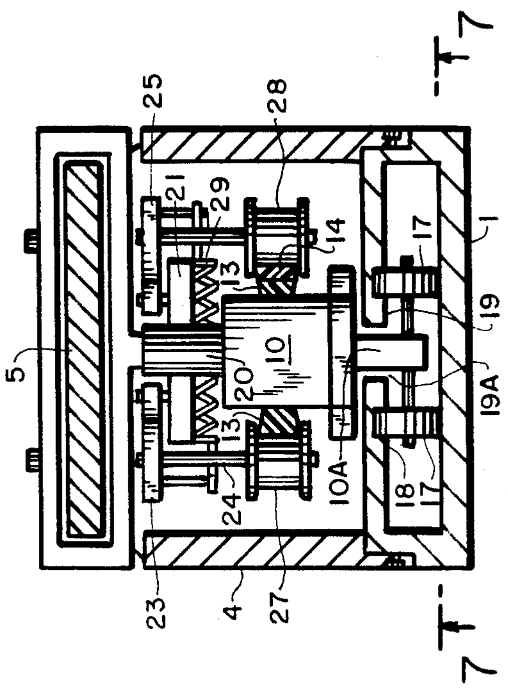
FIG. 8 shows an inverted rear sectional view of mounting arrangement for the distant selector.

The article carrier as shown in FIG. 2 is freely mounted into the body casing by at least 4 wheels 17 mounted into a groove 18 located in the inner portion of the upper lip 19 which positively guide the article carrier 10 through the desired distance. On the upper part of the article carrier is located a holding plate 21 which is securely mounted onto the article carrier by means of 2 screws 22 located at the front and rear ends of the holding plate. Attached to the holding plate is a first holding member 23 and a second holding member 25. Each holding member is pivotally attached to the holding plate at one end at an angle ranging from 45° to 160° and at an effective distance by means of known anchoring mechanism which allows for lateral movement. At the other end of the first holding member 23 is mounted a first cam holder 27 and attached to the other end of second holding member is a second cam holder 28. Both cam holders are attached by cam holding pins 24. The cam holding pins should be of sufficient length to allow a space between the holding member and cam holder such that when pressure is applied to the holding members the cam holder pins come to rest on the holding plate which provides sufficient clearance for the belt to move freely between the cam holder and the body of the article carrier, until the belt cam becomes obstructed by the cam holder.

Both holding members are held together by means of a spring 29 which is attached at any point along one half the length of the holding member from the cam holder. The spring is attached in a manner to exert positive pressure on the holding members causing the cam holder pins to rest on the holding plate which causes the cam holder to obstruct the belt cam causing the article carrier to move in the direction of the obstruction.

The article carrier is transported by a mechanism comprised of a pair of left and right pulley wheels 11 and 12 as viewed in FIG. 2, respectively wherein the right pulley is rotatably permanently mounted on frame 1 by means of an axle, and the left pulley is rotatably adjustedly mounted on frame 1 by means of an axle attached to a movable plate which can be adjusted to tension the belt. The right pulley wheel 11 is driven by a switch actuated motor 48 which is also mounted on body 1. The belt is entrained about the pulley wheels 11 and 12. The belt can be made of rubber similar to a fan belt in an automobile or the like.

In the alternative the article carrier may be transported by means of a chain and gear assembly. It is preferred however, to utilize the pulley and belt.

The preferred belt of the present invention has a belt cam permanently attached thereto, said belt cam being comprised of a build up of materials or a bulge, bulging enough to cause an obstruction when the belt cam contacts the cam holder at a given rpm creating a tension on the belt which together with the tension exerted by spring 29 on the holding members prevents the belt cam from slipping through the holding member causing the belt cam to move the article carrier through the desired distance. Further, the belt cam must be resilient enough so that when the article carrier reaches its desired distance the belt cam may freely pass through the cam holder and about the curvature of the pulley and picks up the article carrier causing it to move in the opposite direction.

The functional means are attached to the article carrier by means of a front mount and a rear mount. Mounting is accomplished by means of two screws 26 holding the functional means firmly against the article carrier mount.

The functional means may be attached to the article carrier to perform numerous functions or useful services such as painting, sanding, buffing, sleeking, cutting, drafting, applying coating composition or like functions. It is preferred, however, to utilize the present invention as a finishing means such as painting and scraping.

Attached to the cover plate 5 is a distance selector 8 which can be moved along said cover plate to adjust the distance travelled by the article carrier. The holding screw 9 holds the selector in the selected position.

Figure 9:
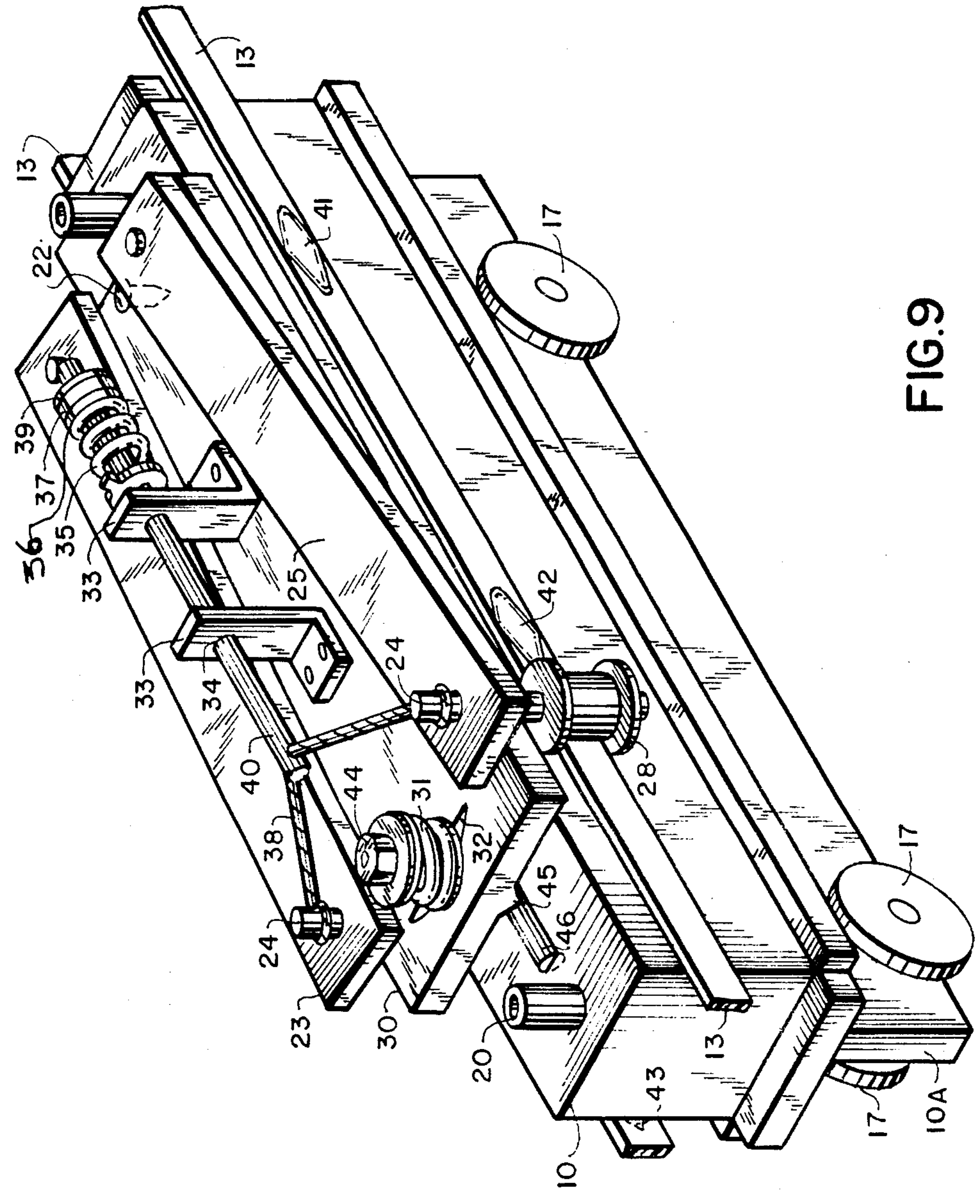
FIG. 9 shows another embodiment of the present invention illustrating a mounting arrangement for the tensioning means.

FIG. 9 of the present invention illustrates a second embodiment of the article carrier wherein the holding plate 30 is mounted onto the article carrier 10 by means of a rear holding screw. Washers are also placed on the holding screw between the holding plate and the article carrier. The holding plate 30 has an arc shaped opening in the front section. A bolt is vertically mounted through said opening in the holding plate and is permanently anchored in the article carrier 10. A spiral spring 31 is mounted on said bolt by means of a washer and nut 44. The spiral spring 31 exerts positive pressure against the holding plate 30 and the pressure exerted by the spring can be adjusted by said nut 44.

The holding plate 30 is positioned on the article carrier to make lateral movement on said article carrier 10. The arc 32 opening in said holding plate 30 acts as a guide and a stopping mechanism for the holding plate 30. The first holding member 23 and the second holding member 25 are pivitolly mounted on the rear end of said holding plate. The first cam holder 27 and second cam holder 28 are mounted at the front end of said holding members by means of holding pins 24.

A pair of mounts 33 are vertically permanently attached in the center of the holding plate 30. Each mount has a circular opening 34 through the center or at least ⅜ of its length measured from its base. Through this circular opening 34 in the mount is passed a rod. At the rear of the rod a coil spring 35 is mounted and held in place by means of a washer 36 and nut 37. At the front of the rod a coupling means 38 is attached, connecting said rod to the cam holder pins. The spring attachment at the rear of the rod is designed to apply pressure on the first holding member 23 and second holding member 25. This can be accomplished by adjusting the nut 39 on the rear of rod 40.

In this embodiment the pressure on said first and second holding members cause the cam holder pins 24 to come to rest on said holding plate. The lateral movement of said holding plate 30 creates a closing and/or opening between the first and second cam holder alternately.

During operation, a belt cam 42 is engaged by second cam 28. The clearance created between the first cam holder 27 and the body of the article carrier 10 allows belt cam 43 to pass freely between first cam holder and the body of said article carrier. The pressure exerted by the spiral spring 31 attached to the bolt mounted through arc opening 32 on article carrier 10 maintains holding plate 30 in its present position. As a result of the above, the belt cam 42 now becomes engaged by first cam holder 28 and the body of the article carrier. Should the article carrier be obstructed before it has travelled its desired distance, both cams may become engaged by said first and second cam holder. Said first and second cam holder 27 and 28 are moved away from the body of said article carrier 10, releasing both cams. The spring mounted onto the rod will continue to tension said first and second holding members, so that the first cam holder and the second cam holder regain their former position causing said cam holder pins to rest against said holding plate 30. Said holding plate has a lip centered on the bottom front end. Mounted on the top of the article carrier is a roller 46. Said roller is housed and positioned so that said lip 45 of said holding plate 30 causes said holding plate to rest on either side of said roller bearing 46 so that said holding plate cannot rest in a neutral position.

What is claimed is:

1. An apparatus for producing reciprocating motion adaptable for the transportation of a variety of functional means and a transport mechanism comprising: a pair of spaced apart pulleys, a continuous drive belt of resilient material entrained about the pulleys, switch actuated motor means for driving the pulleys and the belt in both directions, at least one belt cam permanently attached to the belt gripped by an article carrier against the belt by means of a first cam holder and spring mechanism which causes the belt cam to move the article carrier in one direction.until the article carrier contacts a distance terminator at a desired distance, at which point the article carrier stops with the belt and pulley still in motion causing the spring mechanism holding the first cam holder against the belt to release its grip on the belt cam to allow the belt cam to continue around the pulley to be gripped by a second cam holder, transporting the article carrier in an opposite direction.

* * * * *